(12) United States Patent
Fratello et al.

(10) Patent No.: US 6,283,135 B1
(45) Date of Patent: Sep. 4, 2001

(54) VEHICLE WASHING SYSTEM WITH UNIQUE NOZZLE ARRANGEMENT

(75) Inventors: Daniel Fratello, Golden, CO (US); Roy Sample, Amesbury, MA (US)

(73) Assignee: Mark VII Equipment, Inc., Arvada, CO (US)

( * ) Notice: Subject to any disclaimer, the term of this patent is extended or adjusted under 35 U.S.C. 154(b) by 0 days.

(21) Appl. No.: 09/574,554

(22) Filed: May 17, 2000

Related U.S. Application Data

(62) Division of application No. 09/220,817, filed on Dec. 23, 1998, now Pat. No. 6,095,438.

(51) Int. Cl.[7] .................................................. B60S 3/04
(52) U.S. Cl. .................................................... 134/123
(58) Field of Search ........................................ 134/45, 123

(56) References Cited

U.S. PATENT DOCUMENTS

| | | | |
|---|---|---|---|
| 3,038,481 | * | 6/1962 | Brechtel ........................ 134/123 X |
| 3,974,965 | | 8/1976 | Miller ............................ 239/432 X |
| 4,798,217 | * | 1/1989 | Hanna ............................ 134/123 X |
| 5,076,304 | | 12/1991 | Mathews ........................ 134/123 X |
| 5,413,128 | * | 5/1995 | Butts ............................. 134/123 X |
| 5,575,852 | | 11/1996 | Chase ............................ 134/123 X |

* cited by examiner

Primary Examiner—Philip R. Coe
(74) Attorney, Agent, or Firm—Dorsey & Whitney LLP

(57) ABSTRACT

A vehicle washing apparatus of the gantry type is adapted to reciprocate linearly along the length of a vehicle. Both upper washing mechanisms and side washing mechanisms are tiltably mounted on the gantry so as to tilt around the front and rear of the vehicle for optimal cleansing thereof. Pairs of fixed spray nozzles for delivering a pre-soak solution are positioned along each side and the top of the apparatus with one nozzle in each pair being angled rearwardly relative to a vehicle to spray the front and a side of the vehicle and another nozzle in each pair being angled forwardly relative to a vehicle to spray the rear and a side of the vehicle. An auxiliary delivery system for a paint conditioner or the like is disposed on the gantry for delivering the solution to the sides and top of the vehicle in horizontal rows and may be delivered in different colors for aesthetic purposes. The paint conditioner can be rinsed from the vehicle with the tiltable washing mechanisms.

6 Claims, 9 Drawing Sheets

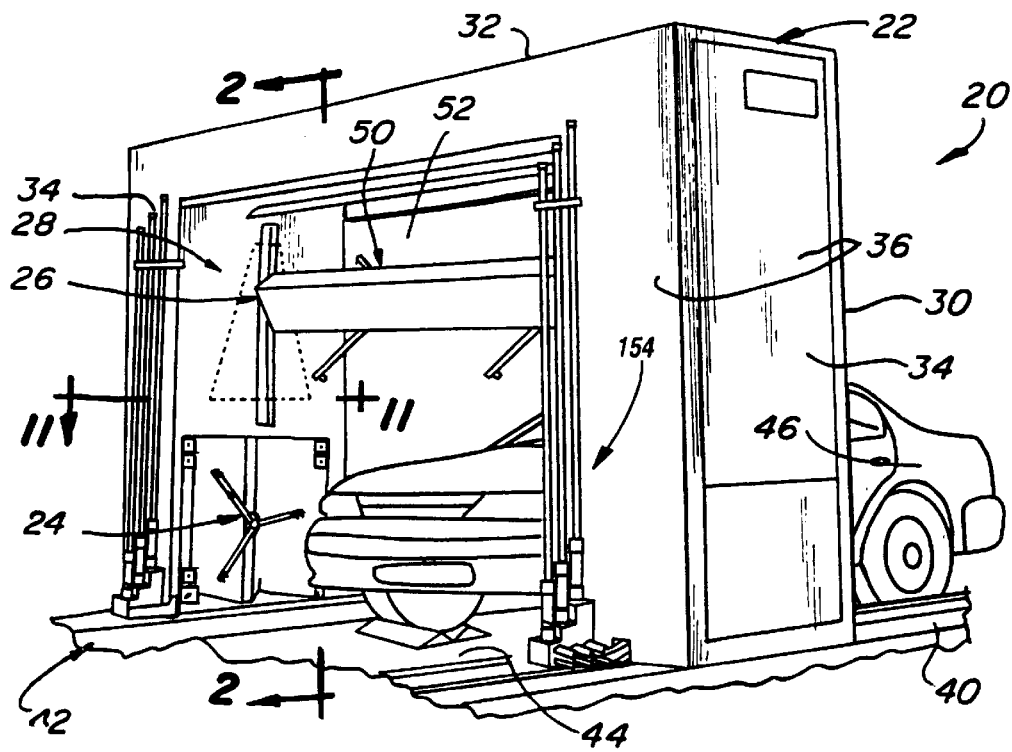
Fig_1
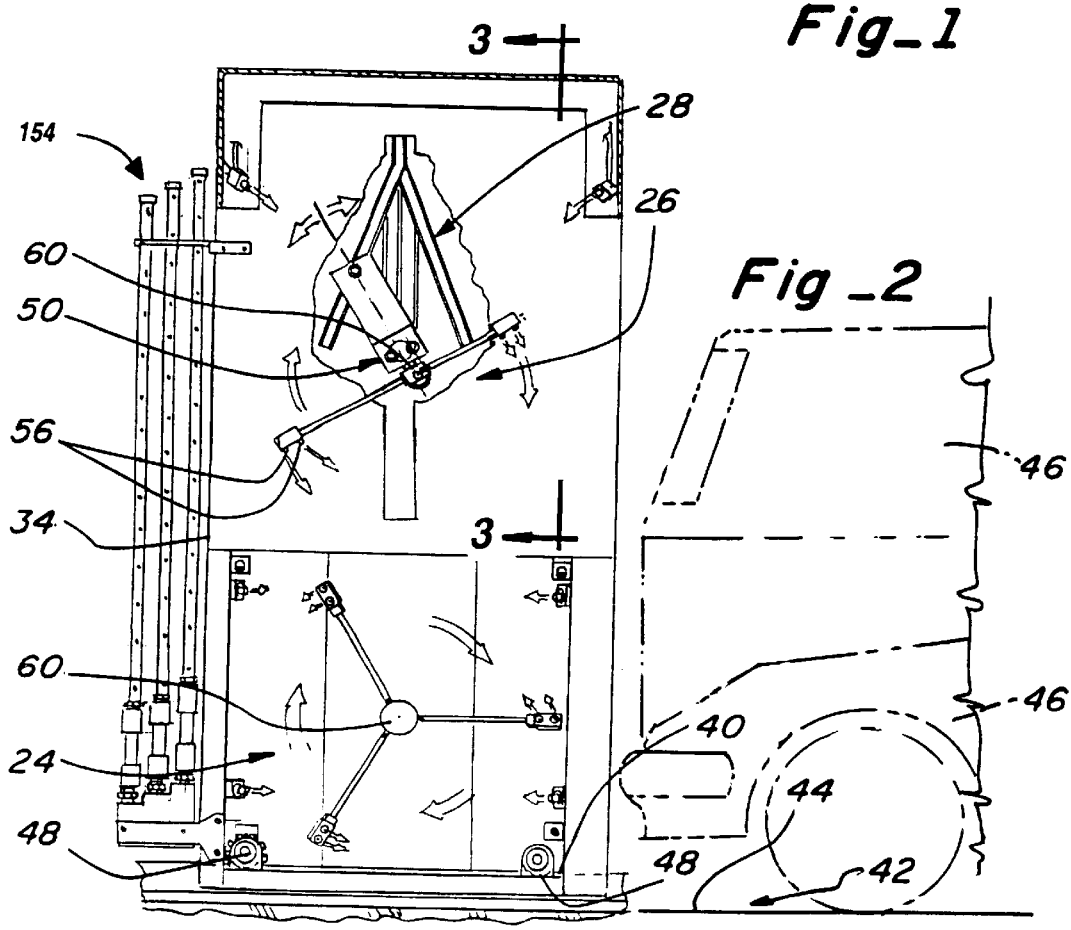
Fig_2

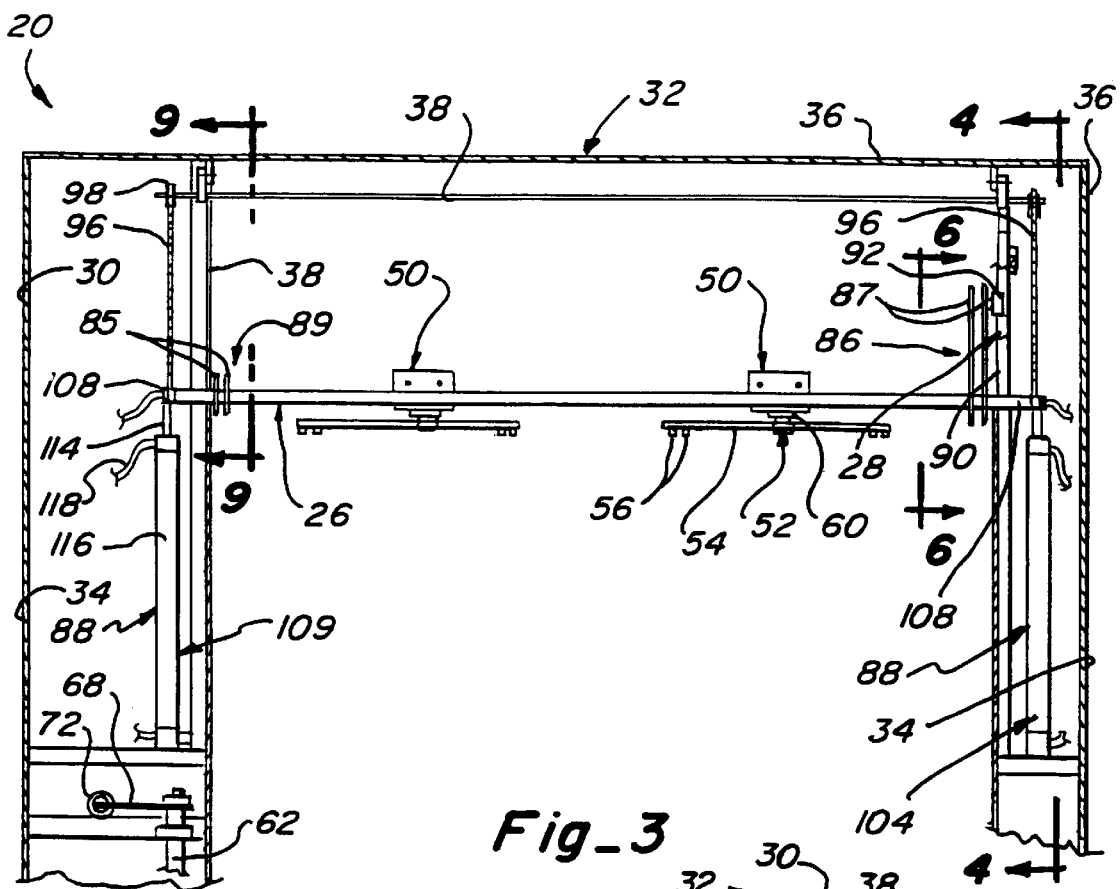
Fig_3
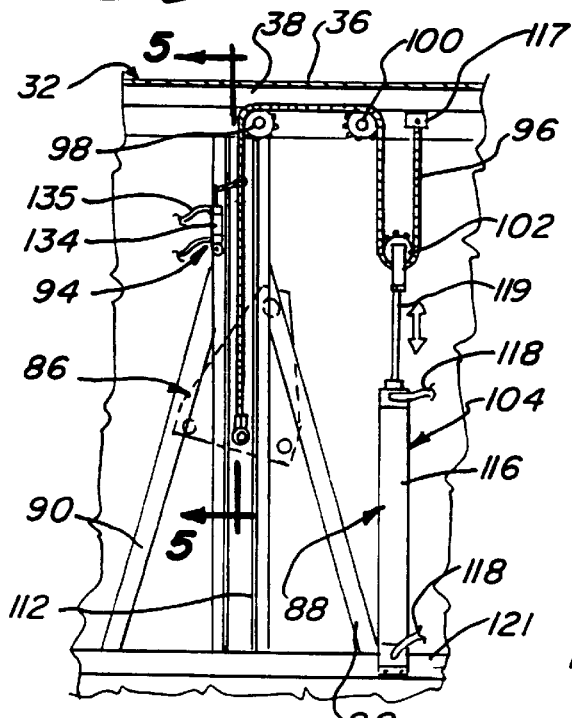
Fig_4
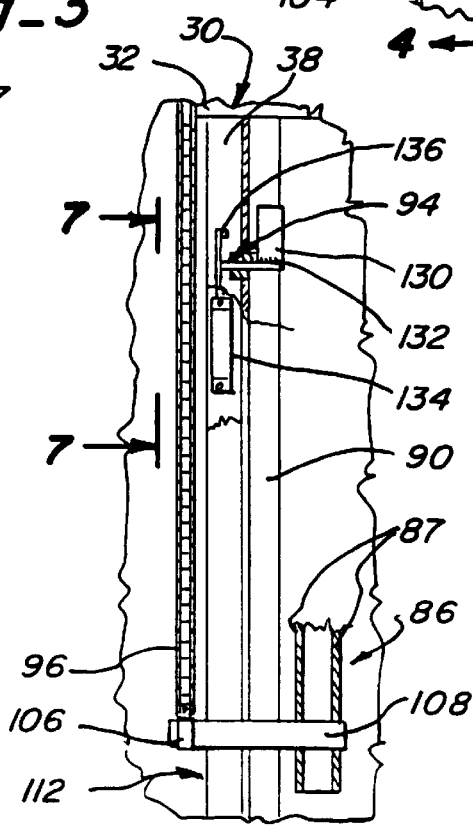
Fig_5

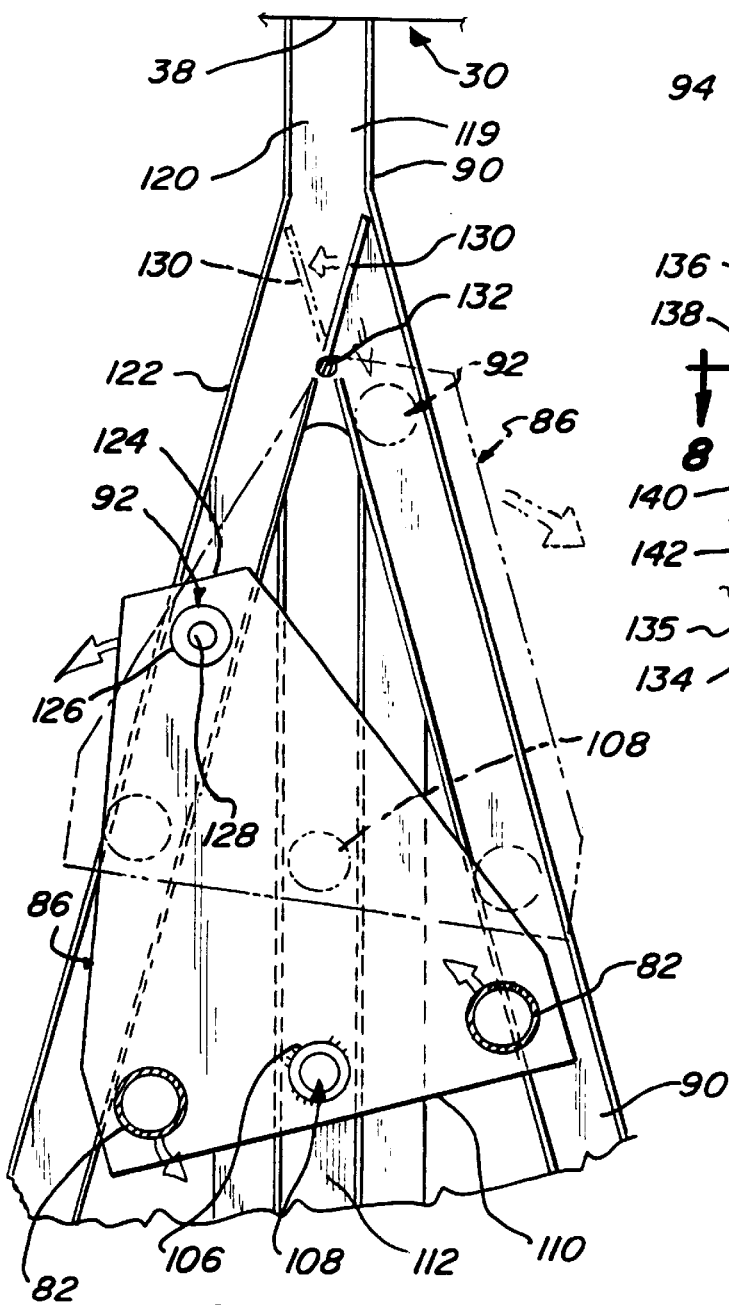
Fig_6
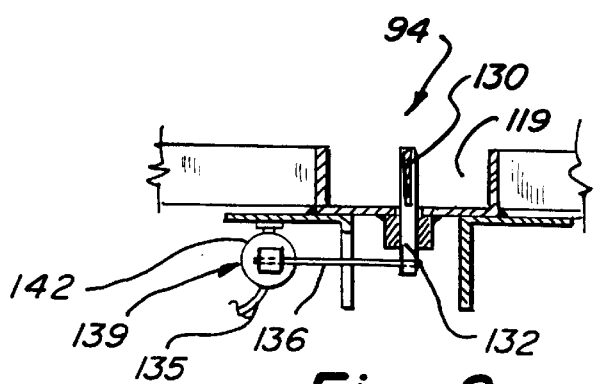
Fig_7
Fig_8

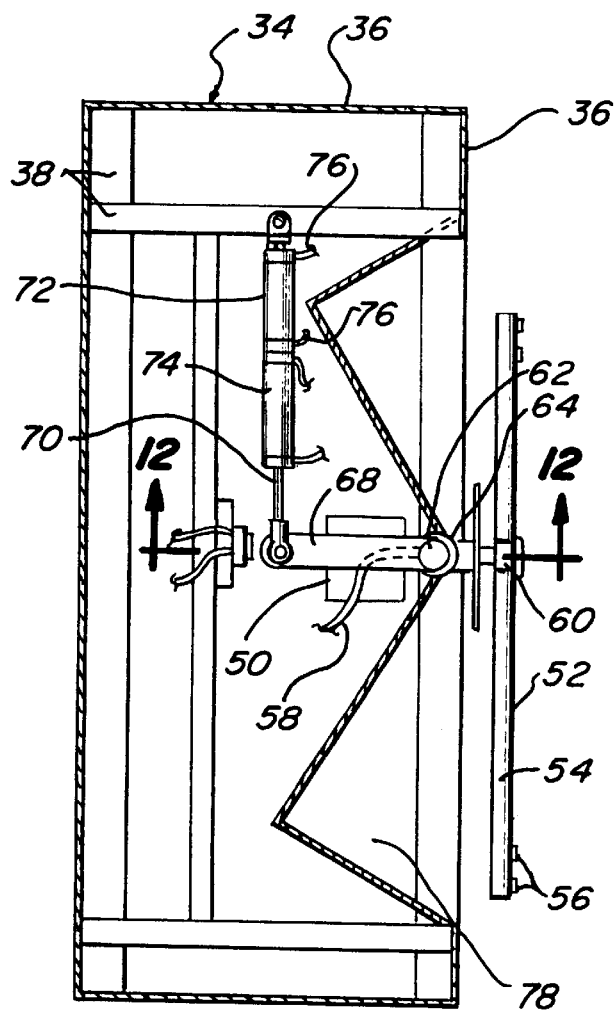
Fig_11
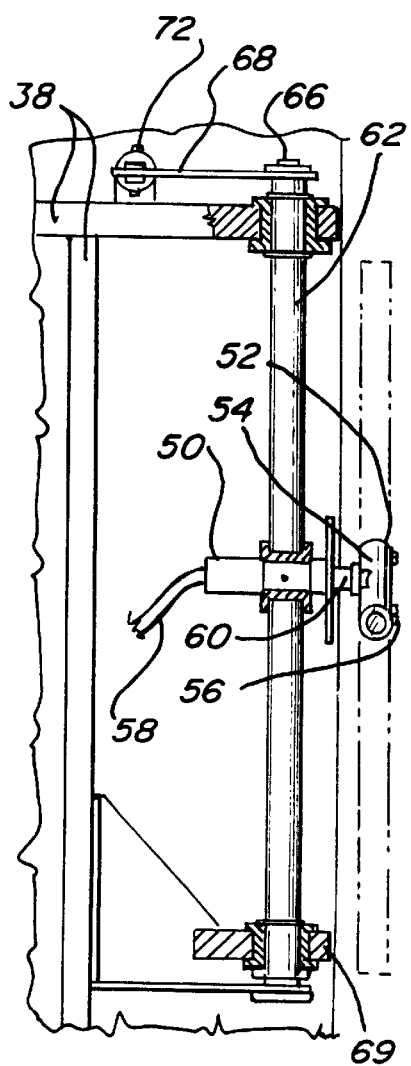
Fig_12
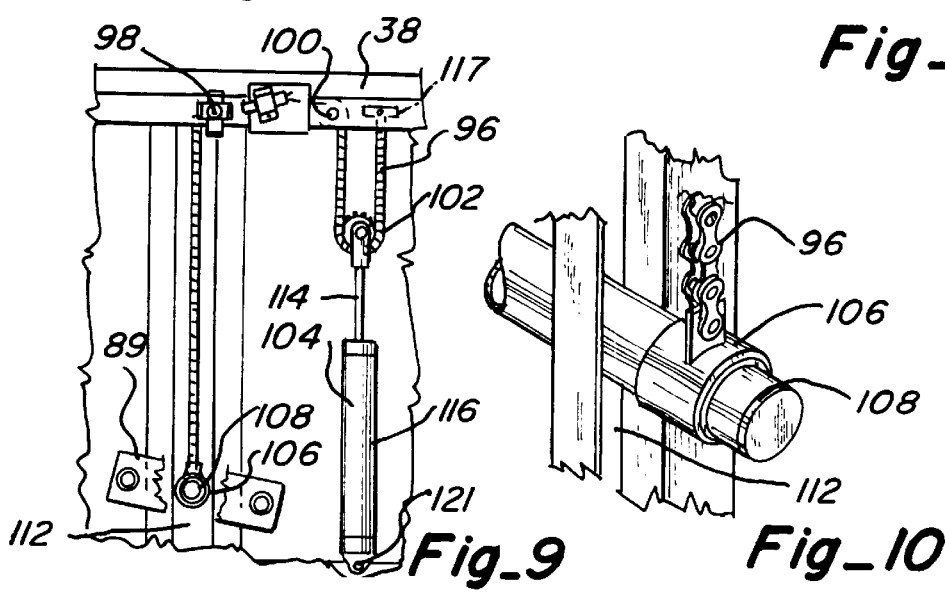
Fig_9
Fig_10

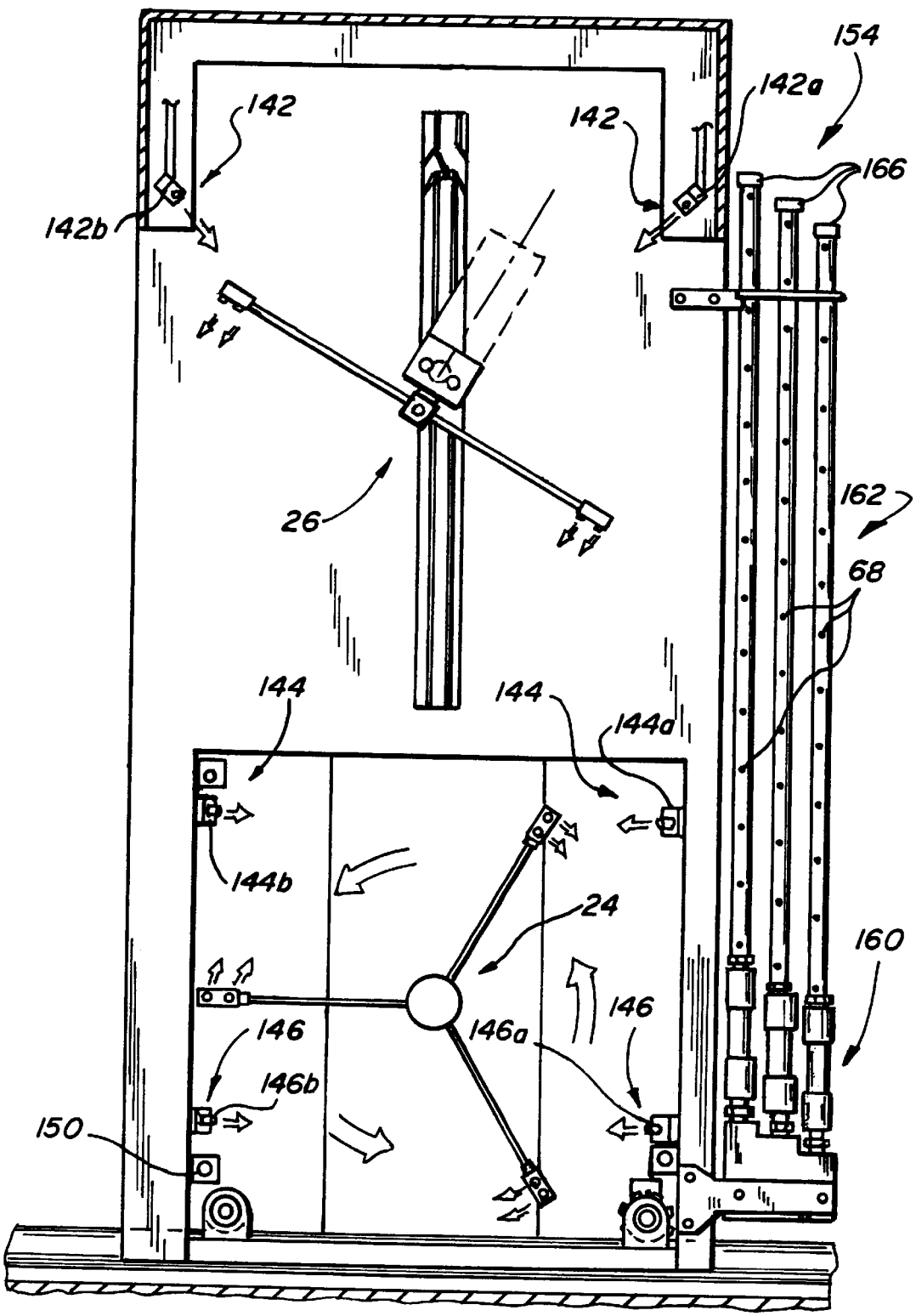
Fig_13

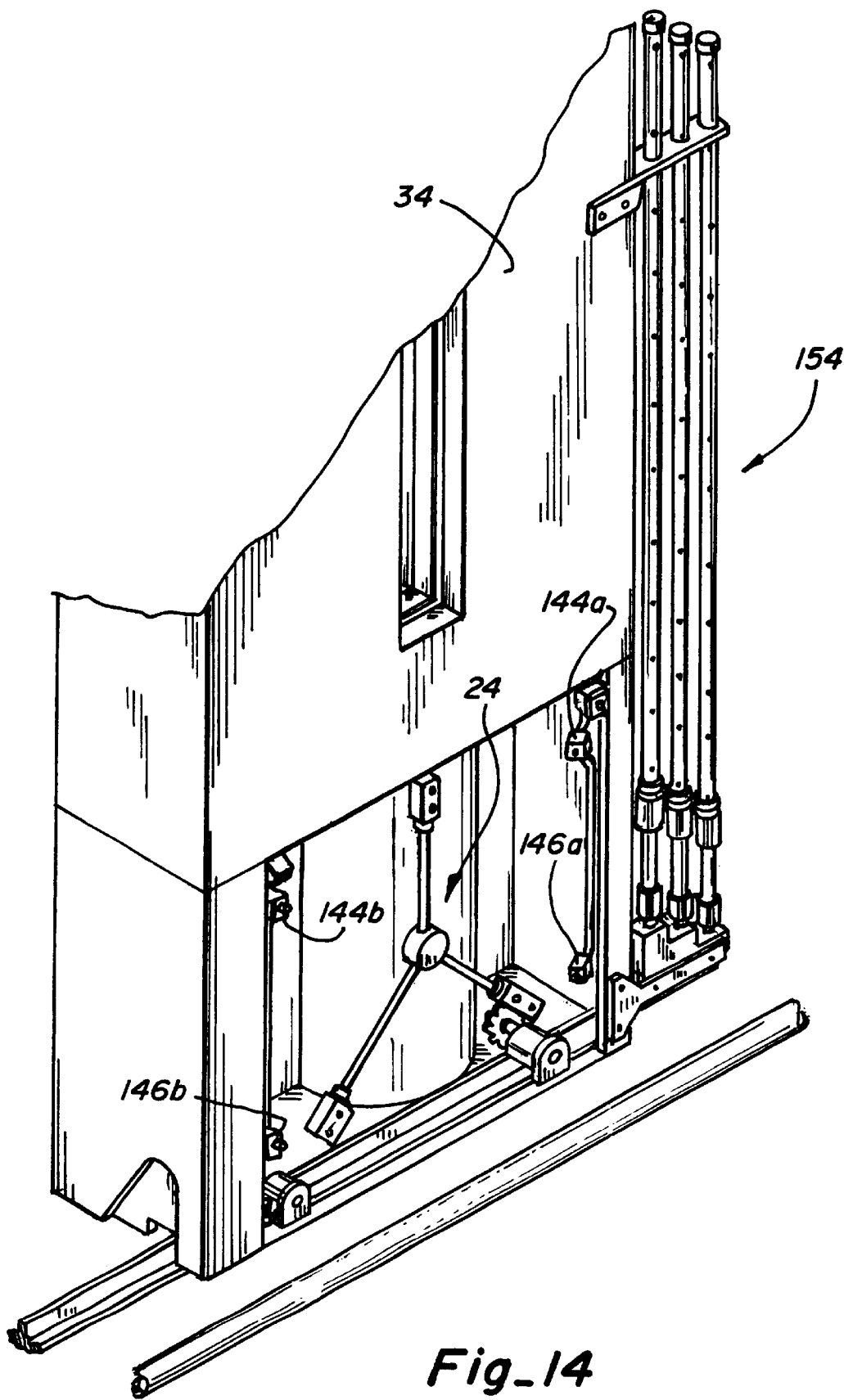
Fig_14

VEHICLE WASHING SYSTEM WITH UNIQUE NOZZLE ARRANGEMENT

This application is a division of U.S. application Ser. No. 09/220,817, filed Dec. 23, 1998, and now U.S. Pat. No. 6,095,438 for a Vehicle Washing System.

BACKGROUND OF THE INVENTION

1. Field of the Invention

The present invention relates generally to automatic vehicle washing systems and, more particularly, to a new and improved reciprocating gantry-type washing system designed to efficiently wash the top, front, rear and sides of a vehicle.

2. Background of the Invention

There are many techniques for washing vehicles without conventional hand scrubbing. Perhaps the most common washing system is the tunnel-type car wash system wherein a vehicle to be washed is passed through a series of linearly spaced cleaning stations. Each cleaning station executes a different sequential cleaning operation such as pre-soaking, rinsing, scrubbing, waxing, and related operations. However, although tunnel-type washes are generally considered to be effective in washing vehicles, tunnel-type washes may be detrimental to a vehicle's finish.

In some conventional tunnel-type wash systems, "mitter curtains" comprised of strips of cloth that are rocked back and forth transversely across the path of the vehicle, abrasively scrub dirt and other debris from the surface of the vehicle. Alternately, or in combination with a mitter curtain, revolving brushes may rotatably engage the surface of the vehicle. In either case, the vehicle surface may be scratched by contact with granular dirt particles that may have collected on the mitter curtains or brushes, and/or may contact with the brushes or curtains themselves.

Alternately, "brushless car washes" do not scratch the surface of vehicles because no parts of the brushless car wash contact the surface of the vehicle. Instead of using mitter curtains or brushes, brushless car washes spray clean exterior surfaces of a vehicle with pressurized fluid jets that are passed adjacent to the surface of the vehicle. The jets are arrayed in a washing frame which revolves around the vehicle or passes linearly along the vehicle, or the frame may be kept stationary while the vehicle is passed through the frame. In any case, the object is to submit the entire readily visible exterior surface of the vehicle to the spray jets to remove dirt and grease from the vehicle surface.

Unfortunately, the cleaning ability of the system is largely dependent upon the pressure generated by the jet sprays, and the further away the spray jets are from the vehicle, the less fluid pressure is delivered to the vehicle surface. Accordingly, those parts of the vehicle which are furthest from the washing frame may not be adequately cleaned. Improved automated systems have been devised for moving the washing frame along a curved track in front and behind the vehicle to minimize the problem but such systems may be costly because they typically are mechanically more complex and/or must be suspended from an overhead surface.

Systems have also been devised for spraying after-wash conditioning liquids or foams onto the surface of a vehicle to protect the surface. An example of such a system is disclosed in U.S. Pat. No. 5,575,852 issued to Chase. In this system, a plurality of inverted L-shaped tubes are mounted on a gantry-type car wash system with each tube having a mixing zone adjacent the top center of the gantry, a buffer zone at an elbow of the tube, and a fluid delivery zone extending vertically downwardly along the side of the vehicle being washed. A mixture of chemical solution and air is introduced to the mixing station and then delayed through the buffer zone before being delivered to the discharge zone from which the pressurized chemical solution is sprayed onto the side of the vehicle through spray nozzles. Such systems are somewhat clumsy and awkward to mount since they extend across the top of the gantry as well as down its sides and, further, are fairly long in length due to the required buffer zone between the mixing and discharge zones. The afore-noted patent has addressed the clumsiness of the system by incorporating the buffering zone in one embodiment into the mixing zone but in either event, the tubes still relatively long and extend horizontally across the top and vertically along the sides of the gantry.

Another prevalent drawback of conventional brushless systems resides in the fact that they typically have spray nozzles disposed along the sides of the vehicle adapted to spray pre-soak or other cleansing solutions substantially perpendicularly at the sides of the vehicle. Since the nozzles are oriented perpendicularly to sides of the vehicle, they do not provide sufficient coverage on the front and rear surfaces of the vehicle and, therefore, typically the wash system will have to make a pass in each direction along the length of the vehicle so that the front and rear of the vehicle are sprayed twice in an attempt to get a sufficient amount of solution onto the surfaces for adequate cleansing of the car. Making a double pass, of course, is time consuming and also is a waste of solution to the extent that it is sprayed twice on the sides of the vehicle where adequate coverage should be obtainable in one pass.

It is an object of the present invention to overcome the afore-noted shortcomings in prior art car wash systems.

SUMMARY OF THE INVENTION

The apparatus of the present invention has been designed to provide a more efficient cleaning of the upper and side surfaces of a vehicle in a brushless vehicle washing system and also an improved system for applying a paint preservative. The more efficient cleaning of the vehicle is achieved through the use of dual selectively operated nozzles that eliminate excessive exposure of the apparatus to the vehicle.

In accordance therewith, the apparatus provides an improved reciprocating gantry-type vehicle washing system. Upper and side surface tilting washing mechanisms on the gantry are movably connected to the gantry so that they can be pivoted into positions in front of and behind the vehicle. The apparatus also includes pairs of fixed nozzles disposed along the vertical sides and top of the gantry with these nozzles primarily being adapted to spray pre-soak chemical solutions or the like onto the vehicle during the wash process. One nozzle in each pair of nozzles is angled rearwardly relative to the vehicle while the other nozzle in each pair is angled forwardly relative to the vehicle. In this manner, when the apparatus is positioned adjacent the front of the vehicle, the rearwardly angled nozzles are supplied with pressurized fluid which is sprayed onto the front and top of the vehicle and as the apparatus is moved rearwardly along the vehicle the fluid is sprayed on the sides and top of a front half or so of the vehicle. At a predetermined location along the side of the vehicle, the supply of fluid to the rearwardly angled nozzles is terminated and the same chemical solution is then supplied to the forwardly angled nozzles which continue to spray the solution on the sides and top of the vehicle until the apparatus reaches the rear of the vehicle where the forwardly angled nozzles are desirably positioned for spraying the chemical solution on the rear of the vehicle. In this manner, a complete and adequate coverage of the surface of the vehicle is obtained in one pass of the apparatus along the length of the vehicle so that the double pass necessary with conventional prior art systems is avoided.

After the pre-soak solution has been applied to the vehicle and rinsed therefrom with the tilting mechanisms, a new and improved auxiliary treatment system that is secured to the gantry applies a paint preservative or the like to the vehicle with the system including a plurality of vertically upwardly extending tubes on each side of the gantry that are in communication with pressurized air and a liquid supply of the paint preservative solution. Each vertically extending tube is identical but mounted at a different elevation. Each tube includes a delivery zone at the top thereof that includes a plurality of vertically spaced discharge openings and a contiguous mixing zone immediately therebeneath. The mixing zone includes an insert of reticulated foam or the like so that the mixture of pressurized air and liquid solution can be adequately mixed and foamed as desired before being delivered to the surface of the vehicle through the discharge openings. Since each tube is identical but mounted at a different elevation, the discharge openings are disposed at different elevations so that the liquid or foam being dispensed on the vehicle is dispensed along horizontal lines that are each distinct and separate from the horizontal lines of liquid or foam delivered through other discharge openings.

Other aspects, features and details of the present invention can be more completely understood by reference to the following detailed description of a preferred embodiment, taken in conjunction with the drawings and from the appended claims.

BRIEF DESCRIPTION OF THE DRAWINGS

FIG. 1 is a perspective view of the apparatus of the present invention with a vehicle being shown in a position to be cleaned by the apparatus.

FIG. 2 is a fragmentary section taken along line 2—2 of FIG. 1 with parts broken away for clarity and with the apparatus positioned adjacent to the front of one vehicle illustrated in solid lines and the back of a second vehicle shown in phantom lines for illustrative purposes.

FIG. 3 is an enlarged fragmentary section taken along line 3—3 of FIG. 2.

FIG. 4 is a vertical fragmentary section taken along line 4—4 of FIG. 3.

FIG. 5 is an enlarged fragmentary section taken along line 5—5 of FIG. 4.

FIG. 6 is an enlarged fragmentary vertical operational view of a portion of the apparatus shown in two different positions, one position being shown in phantom lines.

FIG. 7 is an enlarged fragmentary section taken along line 7—7 of FIG. 5.

FIG. 8 is a fragmentary section taken along line 8—8 of FIG. 7.

FIG. 9 is an enlarged fragmentary section taken along line 9—9 of FIG. 3.

FIG. 10 is an enlarged perspective view of the lifting rod of the apparatus.

FIG. 11 is an enlarged section taken along line 11—11 of FIG. 1.

FIG. 12 is a fragmentary section taken along line 12—12 of FIG. 11.

FIG. 13 is a vertical section similar to FIG. 2 but without the parts removed that were removed in FIG. 2.

FIG. 14 is a fragmentary isometric view looking downwardly on the inner surface of one side of the apparatus of the present invention.

DESCRIPTION OF THE PREFERRED EMBODIMENT

Figure 15:
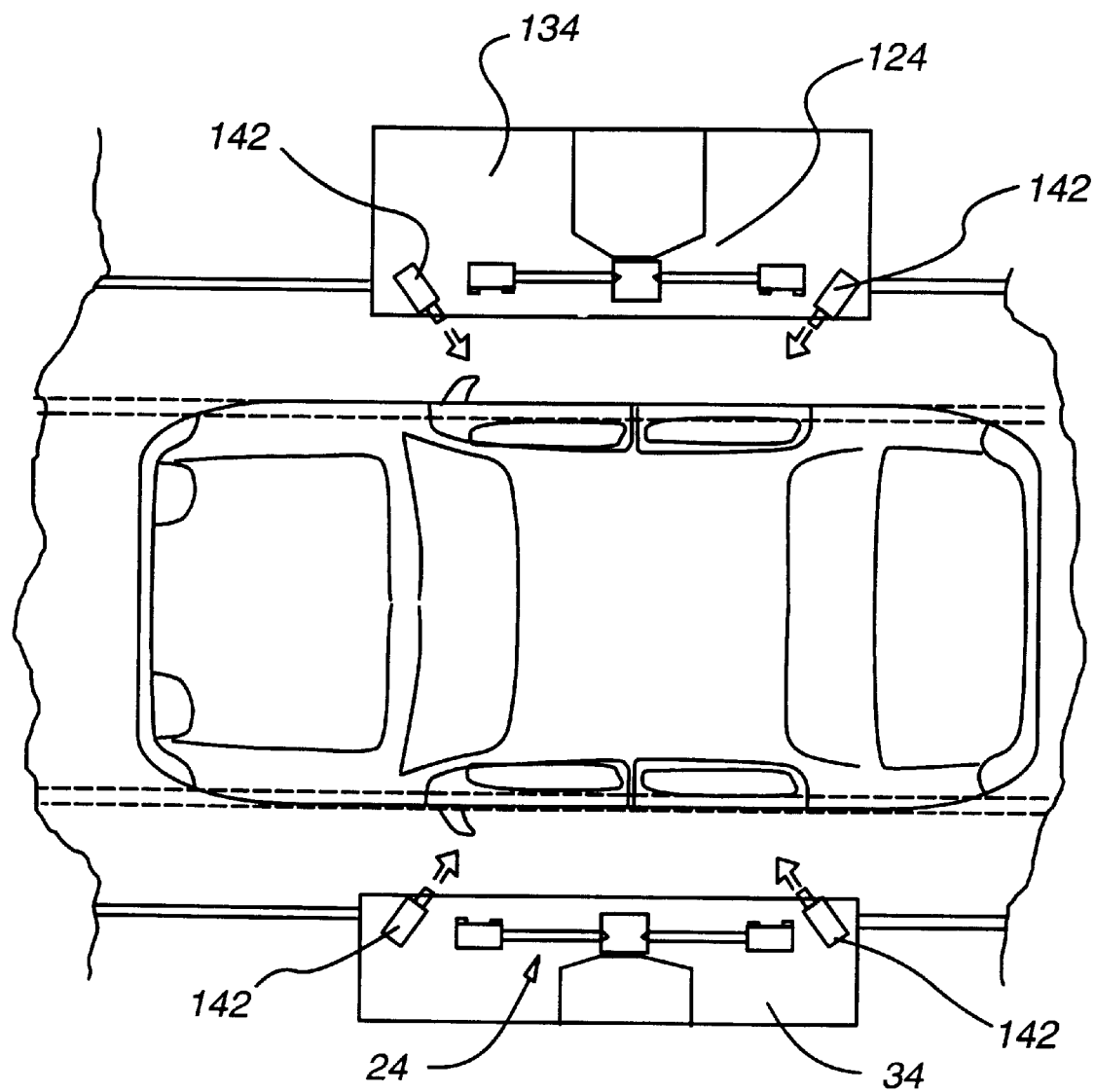
FIG. 15 is a diagrammatic fragmentary view looking downwardly on a vehicle positioned in the apparatus and with the overhead portion of the apparatus removed for clarity.
Figures 16, 17:
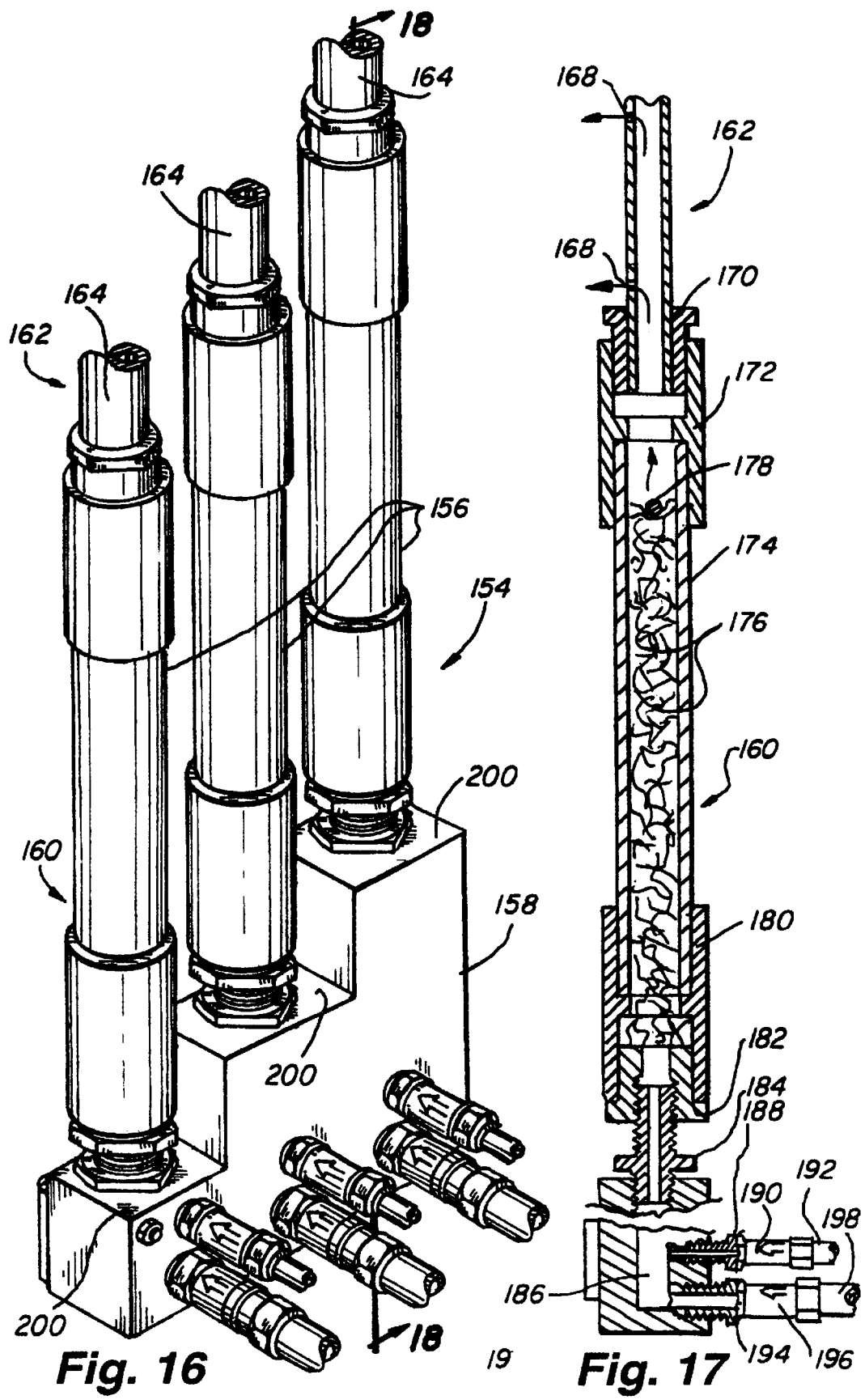
FIG. 16 is a fragmentary isometric showing an auxiliary system for applying a paint preservant liquid to the vehicle
FIG. 17 is a vertical section taken along line 17—17 of FIG. 16.

Referring first to FIG. 1, the washing apparatus 20 of the present invention can be seen to be of the gantry-type, and comprises a gantry structure 22, and a number of working elements including dual side surface washing mechanisms 24, an upper surface washing mechanism 26, and a positioning mechanism 28 for the upper surface washing mechanism. The operation of the gantry structure, side surface washing mechanisms, and upper surface washing mechanism are fully described in U.S. Pat. No. 5,076,304 for a rotary-tiltable car wash system which is commonly owned with the present application and hereby incorporated by reference. The operation of these working elements is briefly summarized to lend context to the improvement of the washing apparatus of the present invention.

The gantry structure 22 is in the nature of an inverted U-shaped housing comprised of a horizontal upper segment 32 supported at its ends by two vertical side segments 34 (FIGS. 1 and 3). The gantry includes a number of planar sheets 36 of suitable rigid material which are mounted upon a structural frame 38. The gantry presents a rigid structure on which the working elements of the apparatus 20 are mounted. The planar sheets define an enclosure or shell for the working elements of the apparatus on opposing vertical side segments and across the horizontal upper segment of the gantry.

The gantry 30 is reciprocally movable along a pair of parallel, tubular rails 40 as shown in FIGS. 1 and 2. The rails are rigidly mounted on a floor surface 42, and the rails define the sides of a wash location 44. A vehicle 46 is driven into the wash location, remains in the wash location during cleaning by the apparatus, and is driven out of the wash location after cleaning. It will be appreciated, however, that alternatively the gantry might be fixed in position and the vehicle driven beneath the gantry.

As shown in FIG. 2, the gantry is mounted on two pairs of wheels with one pair being associated with each vertical segment 34 of the gantry. The wheels are rotatably mounted on axles (not shown) at the bottom of the associated side of the frame, and have a concave radial surface (not shown) having a radius approximately equal to the radius of the tubular rails which the wheels engage. The wheels are driven by a motor, gear reduction boxes and drive belts (not shown) disposed on both sides of the gantry as disclosed in the afore-noted U.S. Pat. No. 5,076,304 so that the gantry can be reciprocably moved along the rails in a smooth and efficient manner. The reciprocating movement of the gantry allows for cleaning of front, middle and rear portions of the vehicle which may be considerably longer than the immediate area covered by the gantry 22 when stationary.

The side surface washing mechanisms 24 shown in FIGS. 1, 2, 11 and 12 are substantially identical and include a rotating manifold mechanism 50 disposed to rotate in a vertical plane perpendicular to the floor surface 42. The side surface washing mechanisms, as well as the upper surface washing mechanism 26, generally are fluid delivery mechanisms which wash the surfaces of the vehicle 46 by delivering pressurized fluid to the vehicle surfaces. The rotating manifold mechanisms include a pressure wand 52 having a hollow body section 54 and a plurality of pressure nozzles 56 for spraying pressurized fluid on the vehicle 46. Each pressure wand is operably connected to a motor, gear box (not shown), and a flexible coupling 58 for providing pressurized fluid to the pressure wand, and is pivotably mounted in a central pivotal bearing seal element 60 which allows the pressurized fluid to be forced through the pivotal seal without leakage. As pressurized fluid is forced through the rotating manifold mechanism, the pressure wand is rotated about the pivotal bearing seal element by the motor and gear box, allowing the manifold to spray cleaning fluid over a circular area as shown in FIG. 2.

The side surface washing mechanisms 24 each include one rotating manifold mechanism 50 which is pivotably mounted to allow the side surface washing mechanism to be angularly oriented to more effectively wash front and back portions of the vehicle 46 when the gantry 30 is positioned at front and back ends of the vehicle. As shown in FIG. 12, the rotating manifold mechanism used in the side surface washing mechanism is mounted on a vertical axle 62 pivotally mounted in brackets 64. As shown in FIGS. 11 and 12, an upper end 66 of the axle is unitarily attached or fixed to a linkage 68 which in turn is connected to a piston rod 70 of a pneumatic power cylinder 72. The body 74 of the power cylinder is pivotably mounted on the frame 38 of the gantry 30, and the cylinder is powered by a source of air pressure (not shown) through pressure couplings 76. The piston rod is of the double-acting type, and can be both extended and retracted.

As shown in FIG. 11, when the power cylinder 72 is retracted, the linkage 68 is pulled in a clockwise direction about the axle 62, rotating the plane in which the pressure wand 52 rotates to be offset in a clockwise direction in the frame of reference shown in FIG. 11. Conversely, when the power cylinder is extended, the power cylinder pushes the linkage in a counterclockwise direction, rotating the plane in which the pressure wand rotates in a counterclockwise direction. The gantry has recesses 78 which allow the plane of rotation of the pressure wand to be retracted within the housing as the rotating mechanism is swivelled. When the rotating manifold mechanism 50 on one side of the gantry is swivelled in a clockwise direction, the rotating manifold on the opposite side of the gantry is swivelled in an opposite, counterclockwise direction, or vice versa, so that the cleaning fluid from the manifolds on opposing sides of the gantry are selectively directed to converge on the front or back of the vehicle 46.

Pivotal mounting of the rotating manifold mechanisms 50 allows the pressure wand 52 to be oriented in a plane more closely covering the front and back of the vehicle 46 being washed. As the plane is adjusted, the pressure wand is more closely positioned to the front and back of the vehicle at the part of the vehicle furthest from the gantry 30, thereby allowing the pressurized fluid to be delivered to the vehicle over a shorter distance, thereby enhancing washing of the front and back of the vehicle.

The upper surface washing mechanism 26, as best shown in FIGS. 1–3, comprises a pair of rotating manifold mechanisms 50 disposed to rotate in a generally horizontal plane as contrasted with the vertical planes in which the side surface washing mechanisms 24 operate. In the preferred embodiment, the rotating manifold mechanisms are mounted on a movable platform 80 which may be tilted as well as raised and lowered to position the upper surface washing mechanism closer to the vehicle 46 being washed to more effectively wash the vehicle, as will be described below. The rotating manifold mechanisms of the upper surface washing mechanism can be seen to be disposed so as to direct washing fluid downwardly at the vehicle so that the fluid impinges upon the upper surfaces of the vehicle, as well as the sides thereof.

Generally, the movable platform 80 includes two horizontally-extending struts 82 which support rotating manifold mechanisms 50 like those used for the side surface cleaning mechanisms 24 (FIGS. 1 and 3). The struts are suitably sturdy to rigidly support the manifold mechanisms 50, and are hollow (FIG. 6) to conduct cleaning fluid supplied thereto through a supply hose (not shown) to the rotating manifold mechanisms. At one end, the struts are rigidly connected to a rectangular end plate system 89 (FIGS. 3 and 9), which in the preferred embodiment is comprised of dual rectangular parallel plate members 85. The dual plate members are rigidly attached to the struts at a distance from each other along the length of the struts, preventing the struts from being twisted relative to each other and maintaining the struts in a rigidly interconnected relationship. At the other end, the struts are rigidly attached to a guide plate system 86 generally shaped as a triangle truncated at the vertices (FIGS. 3 and 6). Like the end plate system, the guide plate system is comprised of dual parallel guide plate members 87 rigidly attached to the struts at a distance from each other, preventing the struts from being twisted relative to each other and maintaining the struts in a rigidly interconnected relationship. The operation of the guide plate system is further described below. The end plate system and the guide plate system are both disposed in vertical planes parallel with and just inside the vertical segments 34 of the gantry 30.

Like the side surface washing mechanisms 24, the platform 80 can be tilted to more effectively clean the surfaces of the vehicle 46. The platform, unlike the side surface washing mechanisms, can also be raised and lowered by the positioning mechanism 28. The positioning mechanism 28 includes lifting mechanisms 88 (FIGS. 3–5) pivotally attached to the guide plate system 86, guide tracks 90 for engaging a guide roller 92 extending laterally outwardly from and journalled to the guide plate system to control the tilting of the platform as the platform is lowered toward the vehicle being washed, and a directing mechanism 94 for controlling the direction of the tilt of the platform.

The lifting mechanism 88 is replicated on each side of the gantry, and while the lifting mechanism is described hereinafter as it is associated with the side of the gantry having the guide plate system 86, it will be appreciated that the lifting mechanism is substantially identical for the side of the gantry receiving the end plate system 84. As shown in FIGS. 3–5 and 9, each lifting mechanism includes a drive chain 96, three idler sprockets 98, 100 and 102, and a pneumatic power cylinder 104. As best shown in FIG. 10, each drive chain, a conventional pivotal link sprocket chain, is secured at one end to a pivotal sleeve 106 rotatably mounted on a lifting rod 108 extending horizontally outwardly and perpendicularly from either the end plate (FIG.

9) or the guide plate (FIG. 4). The lifting rod extending from the end plate is centrally disposed. Considering the guide plate roughly as an isosceles triangle, the lifting rod projects from a centered location adjacent to the bottom edge of the triangular guide plate. Each chain extends upwardly from the lifting rod over a first sprocket 98, the first sprocket having one edge aligned with a lifting channel 112 through which the lifting rod horizontally extends.

The first sprocket 98, like other sprockets used, includes a pivotal cog having teeth extending radially outwardly from its axis and the teeth rollingly engage the links in the drive chain 96 (FIG. 4). The second sprocket 100 is positioned on the gantry frame 38 at a position horizontally displaced from the first sprocket. The drive chain extends horizontally from the first sprocket to pass over the second sprocket and drapes downwardly over the second sprocket toward a third sprocket 102. The third sprocket is mounted on the distal end of a piston rod 114 of the pneumatic power cylinder 104, the body 116 of which is rigidly mounted on a horizontal frame member 121 of the gantry. The power cylinder is operated by a pressure source (not shown) connected to the cylinder through a pressure coupling 118. The drive chain wraps around the third sprocket and extends upwardly to a chain mount 117 rigidly attached to another horizontal frame member of the gantry which positively secures the other end of the chain.

Considering the apparatus from a reference plane parallel with the sides of the vehicle 46 as shown in FIGS. 2, 6, 7 and 9, when the pneumatic power cylinder 104 is retracted, the length of the drive chain 96 between the second sprocket 100 and the third sprocket 102 is increased. Accordingly, the length of the drive chain between the first sprocket and the lifting rod 108 is decreased, lifting the platform 80 as can be best seen in FIGS. 4 and 9. Conversely, when the power cylinder is extended, the length of the drive chain between the second sprocket and the third sprocket is shortened, while the length of the drive chain between the first sprocket and the lifting rod is lengthened, lowering the platform. In this manner the platform, and the attached rotating manifold mechanism 50, can be raised and lowered as needed in order to most effectively clean the surfaces of the vehicle 46.

Tilting of the platform 80 is controlled from one side of the gantry 30 by two oblique guide tracks 90 (FIGS. 4 and 6–8) mounted on the frame 38 of the gantry. The guide tracks are arranged to form an inverted Y-shape, having a continuous inverted Y-shaped guide channel 119 facing inwardly toward the middle of the gantry. The inverted Y-shaped guide channel has a base channel 120, best seen in FIG. 6, and two downwardly-divergent channels 122. In a plane parallel with the guide plate 86, the base channel is collinear with the lifting channel 112 in which the lifting rod 108 moves. The guide roller 92 extends laterally outwardly from the guide plate and is received in the guide channel. Again, considering the guide plate roughly as an isosceles triangle, the guide roller is positioned toward the uppermost vertex of the triangle at the upper corner of the guide plate 124. The guide roller, as best seen in FIG. 6, includes a cylindrical bearing 126 mounted on a roller axis 128 rigidly mounted on the guide plate and extending laterally outwardly to engage the guide tracks.

When the platform 80 is lifted to a maximum height by the lifting mechanism 88, the guide roller 92 is channeled into the upper base 120 of the inverted Y-shaped guide channel 119 which is collinear with the vertical lifting channel 112. As a result, the guide roller is positioned directly above the lifting rod 108 when the platform is lifted to its full height. On the other hand, because the guide roller is constrained to move in the guide channel formed by the oblique, downwardly-diverging channels 122 and the lifting rod is constrained to move in the vertical lifting channel, as the platform is lowered, the guide roller being forced within one of the diverging channels necessarily will become increasingly horizontally displaced from the lifting rod as shown in the plane depicted in FIGS. 4 and 6. Because the guide roller will become horizontally displaced from the lifting rod, the orientation of the guide plate 86 is necessarily titled to the left or to the right as shown in FIG. 6, ultimately titling the platform 80 and the orientation of the rotating manifold mechanisms 80 mounted thereon.

The direction in which the platform 80 is tilted is controlled by the directing mechanism 94. The directing mechanism comprises a deflector barrier 130, having an equivalent thickness to the sides of the guide channel. The barrier pivots about a deflector shaft 132 disposed at the bottom center of the point of merger between the downwardly diverging legs 122 of the channel 119 and the upper base 120 of the guide channel. The deflector barrier alternatively blocks one of the legs 122 to selectively direct the guide roller 92 into only one of the legs of the channel. The directing mechanism is controlled by a pneumatic power cylinder 134 (FIG. 7) secured to a frame member (not shown) of the gantry 30 so as to be pivotal about the lower end thereof. The power cylinder is operated by a pressure source (not shown) connected to the pneumatic power cylinder through pressure couplings 135.

The deflector shaft 132 passes through the guide channel 119 where it is unitarily connected to a link arm 136. As shown in FIG. 7, the link arm is pivotally connected to a piston rod 140 of the pneumatic power cylinder 134. As will be appreciated, extension and retraction of the piston rod moves the barrier 130 reciprocally through the link arm 136 between the solid line and the phantom line positions of FIG. 6 so as to selectively divert movement of the guide roller between the divergent legs 122. Accordingly, when the platform 80 is lifted by the lifting mechanisms 88 to maximum height such that the guide roller 92 is raised into the upper base 120 of the inverted Y-shaped channel, the deflector barrier can be switched back and forth by the pneumatic power cylinder to control the direction the platform will be tilted when the platform is lowered.

Figure 18:
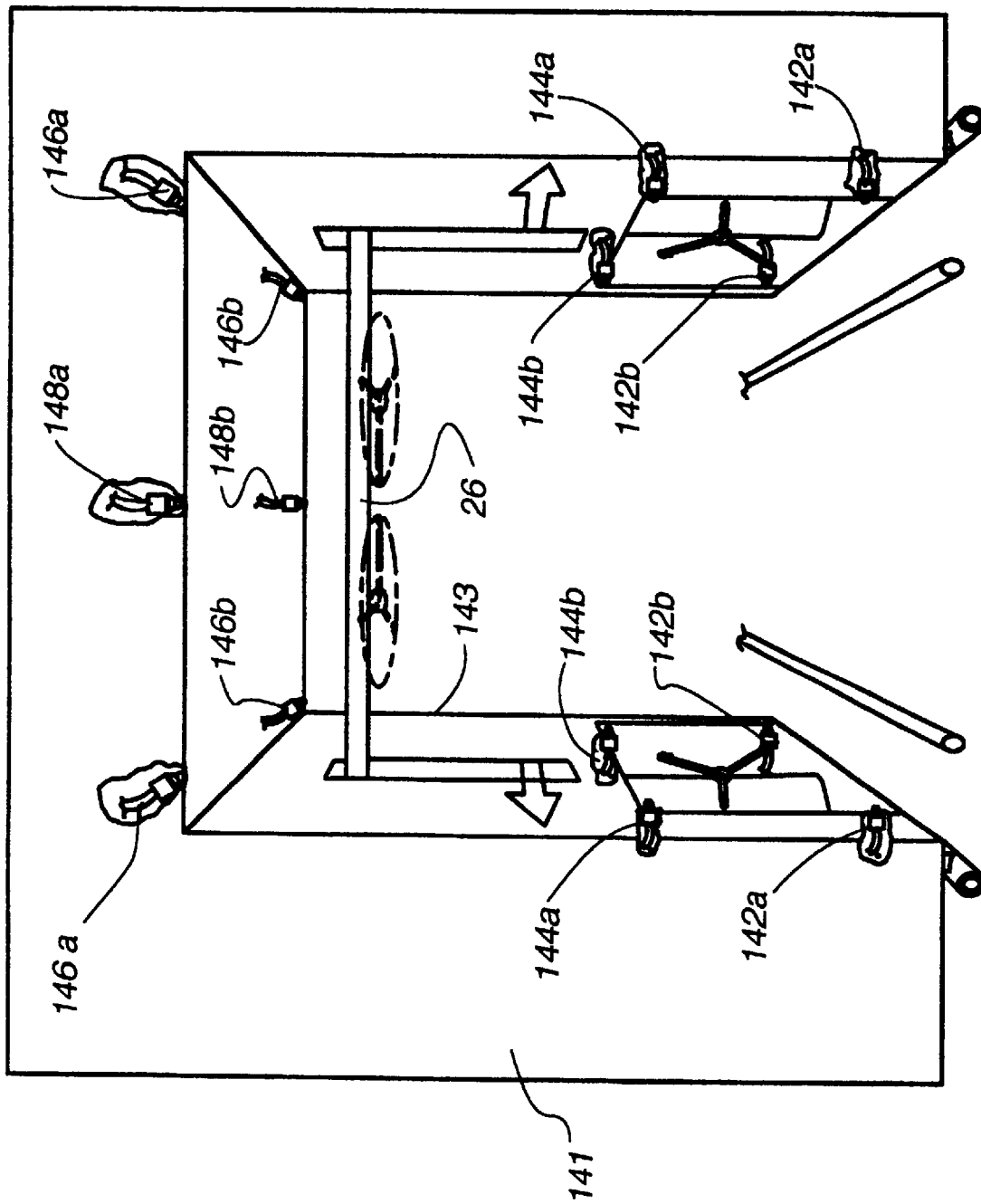
FIG. 18 is a diagrammatic perspective showing the position of the fixed spray nozzles in the apparatus.

Referring to FIGS. 13 and 18, it will be appreciated that the gantry has a front face 141 and a rear face 143 and on each side of the gantry are an upper pair 142, a middle pair 144 and a lower pair 146 of vertically aligned fixed spray nozzles. There is also a fixed nozzle 148a at a centered location along the top of the gantry adjacent to the front face and a fixed nozzle 148b at a centered location along the top of the gantry adjacent to the rear face. Each pair of fixed nozzles has a first or front nozzle of the pair adjacent to the front face 141 and a second or rear nozzle of the pair adjacent to the rear face wherein the first and second nozzles of each pair are in a common horizontal plane. All of the fixed nozzles are connected to a pressurized source of fluid such as a chemical pre-soak or degreaser-type solution and the operation of the nozzles is controlled such that the first nozzle of each pair is simultaneously activated with the fixed nozzle 148a and the second nozzle of each pair is simultaneously activated with the fixed nozzle 148b but at a different time than the first nozzles. The first nozzle of each pair 142a, 144a and 146a is angled rearwardly with nozzle 148a while the second nozzles of each pair 142b, 144b and 146b is angled forwardly with nozzle 148b. In addition, the nozzles in the upper pair 142 are angled slightly downwardly and are positioned above the top surface of a vehicle so that fluid emanating therefrom is directed downwardly on the top and sides of a vehicle being washed.

The fixed nozzles are oriented so that the spray of fluid therefrom completely covers the vehicle in one pass of the apparatus along the length of the vehicle. When the apparatus is positioned adjacent to but slightly forwardly of the front of the vehicle, the first nozzle 142a, 144a and 146a of each pair and the nozzle 148a which are angled rearwardly, are activated so that fluid is sprayed at the front of the vehicle and as the apparatus moves rearwardly along the length of the vehicle, the spray from the first nozzle of each pair and the nozzle 148a continues to a predetermined location (e.g., halfway along the length of the car) at which point the first nozzle in each pair and nozzle 148a are deactivated and the second nozzle 142b, 144b and 146b of each pair and nozzle 148b are activated. Since the second nozzle of each pair and the nozzle 148b are angled forwardly, the initial spray therefrom overlaps the last of the spray from the first nozzles and, while the apparatus continues its rearward movement, the second nozzles continue to spray the remainder of the sides and top of the vehicle and once the apparatus has reached a position slightly behind the rear of the vehicle, due to the forward angle of the second nozzles, the spray is directed at the rear of the vehicle. It will, therefore, be appreciated that complete coverage of the vehicle is achieved in one pass of the apparatus along the length of the vehicle. Of course, the process can be reversed if the gantry is moving from the rear to the front of the vehicle.

An auxiliary treatment system 154 (FIGS. 1, 2, 13, 14, 16 and 17) for spraying a paint preservative or the like onto the vehicle after the vehicle has been washed with the aforedescribed systems, is shown mounted adjacent to the rear face of the apparatus 20 on each side 34 thereof. The auxiliary treatment system consists of two sets of three vertically oriented tubes 156 with three of the tubes being disposed on each side 34 of the apparatus. The tubes 156 are of equal length but mounted on a stepped manifold 158 so that the tubes sequentially extend upwardly to three different elevations. Each tube has a lower mixing zone 160 and an upper dispensing zone 162 which are contiguous with each other. The upper dispensing zone is merely a hollow tubular conduit 164 that is capped at its upper end 166 and has a plurality of uniformly spaced discharged openings 168 along its length with the openings being directed inwardly toward a vehicle positioned within the apparatus. As best seen in FIG. 18, the hollow dispensing conduit is seated in a sleeve 170 and sealed therein in any conventional manner, such as by chemical fusion. The sleeve 170 in turn is positioned in the open upper end of a connector 172 whose open lower end sealingly receives the upper end of a second conduit 174 that forms the mixing zone 160. The upper end of the second conduit 174 is sealed in the connector 172 in any conventional manner, such as with chemical fusion. Positioned within the mixing conduit 174 is a reticulated foam material 176 or the like which is held in position by a stop or cross pin 178 that extends through the mixing conduit and the associated connector 172 at the upper end of the mixing conduit. The lower end of the mixing conduit 174 is seated in the open upper end of a lower connector 180 and sealed thereto, such as by chemical fusion, and a lower sleeve 182 is sealed in the open lower end of the lower connector 180 again possibly by chemical fusion. The open lower end of the lower sleeve 182 is threaded and receives the upper threaded end of a nipple 184 with the lower threaded end of the nipple being received in the manifold 158.

The manifold has three separate chambers or compartments 186, one associated with one of the three tubes 156. Each chamber or compartment communicates with a nipple 188 and an associated threaded check valve 190 operably connected to a pressurized air line 192. Each chamber also communicates with another nipple 194 and threaded check valve 196 operably connected to a pressurized line 198 passing to a supply of liquid chemical solution (not shown), such as a foamable paint preservative. Each compartment 186 in the manifold is positioned beneath an outer step 200 in the manifold with each outer step in the manifold designed to receive and support the lower end of an associated tube 156. Each tube is identical and interchangeable but since the tubes are supported at different elevations on the manifold, the discharge openings 168 in each tube are disposed at different elevations so that the pressurized fluid or foam being emitted therefrom is directed onto the vehicle at different elevations. The lines of foam or the like are in horizontal alignment with an associated discharge opening and there, accordingly, will be a plurality of lines of the foam delivered to the surface of the vehicle in alignment with each discharge opening of the three delivery tubes.

While in the disclosed embodiment, the diameter of the dispensing conduit 164 is slightly smaller than the diameter of the mixing conduit 174, as this increases the velocity of flow through the dispensing conduit 164, the conduits could be of the same diameter and, in fact, could be a unitary conduit alleviating the need for the sleeve 170 and the connector 172. Rather, the stop or cross pin 178 would still extend across the conduit to retain the reticulated foam material or the like in the mixing portion of the conduit and discharge openings 168 would still be utilized but they would all be provided in a single conduit of uniform diameter.

The auxiliary treatment system 154 can be used to deliver three different types of solutions or the same solution, for aesthetic purposes, in three different colors. In other words, the solution, such as foam, can be pre-dyed so that when it is applied to the vehicle, a rainbow of colors appear even though each colored line of foam might be the same chemical solution.

The dispensing zone 162 commences at the upper end of the reticulated foam material 176 so that the dispensing zone is contiguous with the mixing zone 160 and due to the short length of the tubes 156 and the pressure of the air driving the mixed solution or foam to the delivery tubes, it can be delivered at a desired pressure which enables it to be dispensed out of the discharge openings 168 onto the surface of the vehicle in a uniform manner.

In a typical operation of the apparatus, a vehicle 46 to be washed is positioned in the washing location 44 and will remain stationary during the washing cycle. The gantry 30 is moved to one end of the vehicle, for example, the front of the vehicle, by the motor driven wheels 48 mounted on the gantry frame 38. The first fixed nozzles 142a, 144a, 146a and 148a on each side of the gantry are then activated so that a pre-soak or degreasing solution is sprayed onto the front of the vehicle and the apparatus is then moved rearwardly along the length of the vehicle. As the apparatus is moving rearwardly, the first nozzles 142a, 144a, 146a and 148a continue to spray pre-soak solution onto the sides and top of the vehicle to a predetermined location at which location the first nozzles are deactivated and the second nozzles 142b, 144b, 146b and 148b are activated to continue to spray the same pre-soak solution onto the sides and top of the vehicle. Initially, the spray from the second nozzles will overlap the location of the last of the spray from the first nozzles and will continue to spray the solution onto the side of the vehicle until the apparatus reaches the rear of the vehicle at which point the spray will be directed at the rear of the vehicle due to the forward angle of the second fixed nozzles.

Upon reaching the rear of the vehicle, the gantry direction of movement is reversed, with no liquid being sprayed from any nozzle, so as to travel toward the front of the vehicle and upon reaching the front of the vehicle, the forward movement of the gantry is terminated. The pneumatic power cylinders of the side surface washing mechanisms 24 deflect the rotating manifold mechanisms 50 to direct the pressure wands 52 to face inwardly in a pattern converging toward the front of the vehicle. The deflector barrier 130 is switched to close off the right leg of the guide channel 119 and the lifting mechanism 88 lowers the platform 80 so that the platform is closer to the front of the vehicle and angled to direct the pressure wands more toward the front of the vehicle. Once in position, the motors (not shown) which control the rotation of the rotating manifold mechanisms are engaged and pressurized fluid, such as water, is introduced into the pressure wands. Consequently, the pressurized water is sprayed over the surface of the vehicle in circular patterns to remove dirt from the vehicle which has previously been loosened by the pre-soak solution.

After the pressurized water is delivered to the rotating wands, the gantry 30, platform 80 and side surface cleaning mechanisms 24 are moved to begin cleaning the rest of the vehicle from front to rear. First pneumatic cylinders 72 are energized to pivot the rotating manifold mechanisms 50 of the side surface washing mechanisms to a neutral position parallel to the sides of the vehicle. At the same time, the platform is lifted toward the upper horizontal segment 32 of the gantry and consequently, the guide channel 119 alters the directing angle of the platform 80 so that the plane in which the rotating manifolds rotate becomes parallel to the floor 42 and the roof of the vehicle and the pressure wands are directed to spray in a downward direction. When the gantry reaches the rear of the vehicle, the washing mechanisms pivot to direct pressurized water directly at the rear of the vehicle. It will be appreciated that due to the fact that the gantry had a return pass from the rear of the vehicle to the front of the vehicle before rinsing the pro-soak solution from the surface of the vehicle, the pre-soak solution has an adequate amount of time to loosen whatever grit and dirt may be on the vehicle. Also, the pre-soak solution along the entire length of the car remains on the surface of the car for approximately the same amount of time so that the entire car is cleaned to the same degree.

The afore-described operation can be repeated for a deeper cleansing of the vehicle and, in fact, different types of pre-soak solutions can be used for more efficient cleaning.

After the apparatus has reached the rear of the vehicle and completed the rinsing or washing cycle as it is referred to in the trade, the washing system is terminated and the auxiliary treatment system 154 is activated. The gantry is then moved in an opposite direction along the length of the vehicle toward the front of the vehicle. During this movement, pressurized air and the paint preservative solution is introduced to the vertical tubes 156 so as to be mixed in the mixing zone 160 to form a foam or the like and thereafter is delivered under pressure to the dispensing zone 162 where the foam or the like is sprayed onto the sides and top surface of the vehicle. The entire exterior surface of the vehicle is covered in a single pass of the apparatus along the length of the vehicle and after a slight delay, the apparatus can be moved in the opposite direction toward the rear of the vehicle to rinse the foam or the like from the surface of the vehicle in the same manner as the pre-soak solution had previously been rinsed from the surface of the vehicle.

Alternatively, the apparatus can be moved to the rear of the vehicle with no spraying and then rinse the foam from the vehicle in a return of the apparatus to the front of the vehicle which allows the foam to remain on all surfaces of the vehicle for approximately the same amount of time.

Each of the above-identified operations are controlled by a computer-driven electronic system (not shown) that operates hydraulic valves where necessary. Such electronic and hydraulic systems are deemed within the knowledge of one skilled in the art and for that reason a detailed description of such system is not made herein.

Although the present invention has been described with a certain degree of particularity, it is understood that the present disclosure has been made by way of example, and changes in detail or structure may be made without departing from the spirit of the invention, as defined in the appended claims.

What is claimed is:

1. A gantry-type car wash apparatus for washing an automotive vehicle that is moving linearly relative thereto in a reciprocating manner, said apparatus including at least one pair of spray nozzles with one nozzle of the pair angled rearwardly relative to the vehicle and the other nozzle of the pair angled forwardly, each nozzle in said pair being operatively connected to a pressurized source of presoak liquid adapted to be selectively sprayed vehicle, a set of nozzles independent of said at least one pair of nozzles for spraying a wash liquid onto said vehicle to wash said presoak solution from said vehicle, and a control system for independently delivering said pressurized presoak liquid to said nozzles, said control system delivering pressurized liquid to said rearwardly angled nozzle but not the forwardly angled nozzle when said apparatus is positioned adjacent to the front of said vehicle and for a predetermined distance from the front of said vehicle along the length of the vehicle and delivering pressurized liquid to said forwardly angled nozzle when said apparatus is positioned adjacent to the rear of said vehicle and for a predetermined distance from the rear of said vehicle along the length of the vehicle and for delivering said wash liquid from said independent set of nozzles onto said vehicle after said presoak liquid has been delivered to said vehicle to wash said presoak liquid off the vehicle.

2. A gantry-type car wash apparatus for washing an automotive vehicle that is moving linearly relative thereto in a reciprocating manner, said apparatus including at least one pair of spray nozzles with one nozzle of the pair angled rearwardly relatively to the vehicle and the other nozzle of the pair angled forwardly, each nozzle in said pair being operatively connected to a pressurized source of liquid adapted to be selectively sprayed onto said vehicle, and a control system for independently delivering said pressurized liquid to said nozzles, said control system delivering pressurized liquid to said rearwardly angled nozzle but not the forwardly angled nozzle when said apparatus is positioned adjacent to the front of said vehicle and for a predetermined distance from the front of said vehicle along the length of the vehicle and delivering pressurized liquid to said forwardly angled nozzle when said apparatus is positioned adjacent to the rear of said vehicle and for a predetermined distance from the rear of said vehicle along the length of the vehicle, said apparatus further including two side portions with each side portion positioned adjacent to a side of said vehicle and wherein said spray nozzles ate fixed in position and there are at least one pair of said nozzles on each side portion of said apparatus.

3. The apparatus of claim 2 wherein said nozzles in each pair are horizontally spaced.

4. The apparatus of claim 2 wherein there are a plurality of pairs of said fixed nozzles on each side portion of said apparatus and said pairs of fixed nozzles are vertically spaced from the other pairs.

5. The apparatus of claim 4 wherein said apparatus has a top portion and further includes a pair of nozzles on said top portion with one of said nozzles on the top portion being angled rearwardly and the other nozzle of the pair on said top being angled forwardly.

6. The apparatus of claim 2 wherein said apparatus has a top portion and further includes a pair of nozzles on said top portion with one of said nozzles on the top portion being angled rearwardly and the other nozzle of the pair on said top being angled forwardly.

\* \* \* \* \*

UNITED STATES PATENT AND TRADEMARK OFFICE
CERTIFICATE OF CORRECTION

PATENT NO.    : 6,293,373 B1
DATED         : September 25, 2001
INVENTOR(S)   : Rolf Weiler, Elmar Fuchs and Bernd Langner It is certified that error appears in the above-identified patent and that said Letters Patent is hereby corrected as shown below:

<u>Column 4,</u>
Line 7, change "carrier ann formed" to -- carrier arm formed --.

Signed and Sealed this

Eleventh Day of June, 2002

*Attest:*

*Attesting Officer*

JAMES E. ROGAN
*Director of the United States Patent and Trademark Office*